(12) United States Patent
Jin et al.

(10) Patent No.: US 10,768,973 B1
(45) Date of Patent: Sep. 8, 2020

(54) METHOD FOR IMPLEMENTATION AND OPTIMIZATION OF ONLINE MIGRATION SYSTEM FOR DOCKERS CONTAINER

(71) Applicant: Huazhong University of Science and Technology, Hubei (CN)

(72) Inventors: Hai Jin, Hubei (CN); Song Wu, Hubei (CN); Bo Xu, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 16/774,028

(22) Filed: Jan. 28, 2020

(30) Foreign Application Priority Data

Apr. 24, 2019 (CN) .......................... 2019 1 0342058

(51) Int. Cl.
*G06F 9/455* (2018.01)
*G06F 16/11* (2019.01)
*G06F 16/178* (2019.01)

(52) U.S. Cl.
CPC ........ *G06F 9/45558* (2013.01); *G06F 16/119* (2019.01); *G06F 16/178* (2019.01); *G06F 2009/4557* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 2016/0378563 A1* | 12/2016 | Gaurav | G06F 9/5077 718/1 |
| 2017/0264684 A1* | 9/2017 | Spillane | H04L 67/1095 |
| 2018/0213036 A1* | 7/2018 | Vasetsky | H04L 67/1097 |

* cited by examiner

*Primary Examiner* — Sisley N Kim
(74) *Attorney, Agent, or Firm* — Michael X. Ye; Morris, Manning & Martin, LLP

(57) ABSTRACT

The present disclosure provides a method for implementation and optimization of an online migration system for Docker containers.

6 Claims, 2 Drawing Sheets

METHOD FOR IMPLEMENTATION AND OPTIMIZATION OF ONLINE MIGRATION SYSTEM FOR DOCKERS CONTAINER

FIELD

The present invention relates to the field of virtualization, and more particularly to a method for implementation and optimization method of an online migration system for Docker containers.

DESCRIPTION OF RELATED ART

As an emerging computing model, cloud computing has received more and more attention and has had more and more applications. As cloud service scales up and data centers expand, good load balance, which means right allocation of computing resources, has become a challenge in large-scale cloud service platforms, and therefore people have attached increasingly importance to online migration as a technology. In traditional models, the core of cloud computing is virtualization, wherein virtual machines are used to allow maximum utilization of computing resources. Currently, live migration of virtual machines is relatively mature. With the deeper understanding of the concept of containers and growing attention paid to Docker in recent years, people have new thinking about models of cloud services, and believe that containers will enable the cloud to provide more convenient, more flexible and more intense services. Different from virtual machines, containers can share a common host kernel, thereby enabling flexible allocation of computing resources and in turn further enhancing utilization of resources. From the perspective of an operating system, a container represents a process running therein, and it is just the close relationship between containers and their common kernel brings about challenges to live migration of containers. The information about migration states and resources are distributed throughout the operating system and even the kernel, and this fact makes live migration of containers more complicated. However, in order for cloud services to achieve equilibrium scheduling, container live migration is an issue to be addressed. While Docker is currently one of the most extensively adopted container technologies in the industry, there is not a product that perfectly supports online migration of Docker containers. Some existing Docker native solutions do support cold migration of containers and offline migration of real-time states of containers, but they are far from really satisfying applications having demanding real-time requirements. China Patent Publication No. CN107526626A, for example, discloses a CRIU-based Docker container live migration method and a system thereof. The known approach involves recomposing commands for creating Docker containers based on configuration information of the containers, thereby implementing configuration and migration of Docker containers. It combines the characteristics of both shared memory and non-shared memory, and uses different methods for Docker image distribution to implement file system migration of Docker containers, so as to prevent Docker daemon restart that might be otherwise caused by direct migration of disk files of containers as seen in the prior art. With normalization of volume sources and live migration algorithms for volume based thereon, volume migration of Docker containers can be facilitated. Through introduction of Docker registry security mechanisms and Rsync+SSH network communication mechanisms, this approach can ensure confidentiality and integrity of data during migration in non-shared memory environments.

The present invention is aimed at facilitating and optimizing online migration of Docker containers in cloud environments by addressing technical difficulties of implementation of migration systems through analyzing characteristics of Docker containers. Different from other container technologies, Docker features for not depending on any platform. Instead, it introduces an image mechanism for containers and provides a set of delivery criteria. It is just introduction of image hierarchy brings about the first issue about container migration: how to isolate the image data of the operating environment in which containers work from different file system drivers according to parent-child relationship among image layers. The second issue is how to implement online migration of processes. The third issue is how the destination machine Docker to dynamically identify migrated containers after migration and to retain the administration authority to the containers. The present invention addresses the three issues by providing an online migration system for Docker containers, which optimizes redundant transfer processing of image data based on the characteristics of the image mechanism of Docker containers and reduces overall container migration time. The online migration system is a system that has Docker daemon remains active through migration real-time states of Docker containers.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE INVENTION

The term "module" as used herein describes any type of hardware, software, or combination of software and hardware that is capable of performing the functions associated with "module."

In view of the shortcomings of prior art, the present disclosure discloses a method for implementation and optimization of an online migration system for Docker containers. The method for implementation and optimization of an online migration system at least comprises steps of: based on different container file systems and parent-child relationship of their image layers, determining an integrating and collecting mechanism for data of the image layers so as to accomplish integration and collection of the data of the image layers; based on Diff commands between parent image layers and child image layers, determining a latest version of the data of the image layers, and transferring the latest version of the data of the image layers between a source machine container and a destination machine container so as to accomplish iterative synchronization of the data of the image layers; implementing iterative synchronization of a memory by means of implementing a Pre-Copy mechanism; and when the iterative synchronization for both of the data of the image layers and the memory have been completed, performing restoration of the destination machine container. Through the above method, at least the following technical effects can be achieved: firstly, based on the analysis of the hierarchical relationship of the local image layer to collect the image data required by the Docker container, the end-to-end Docker container data migration can be realized, and it has good scalability. Secondly, during the Docker container image migration process, redundant data transmission is avoided with finer granularity and the image migration is accelerated. Thirdly, based on the Pre-Copy algorithm, iteratively synchronizing the incremental memory dirty page data to control the downtime of the container migration process within a preset threshold, effectively improves the quality of Docker container service.

According to one mode, the integration and collection of the data of the image layers at least comprises steps of: identifying parent-child hierarchical relationship between tags of the image layers of the container based on the current file system and a container ID, and collecting configuration information about the container based on the container ID; based on the container ID and a container configuration file, integrating information about metadata of the image layers and information about metadata of a container image in an image management directory; and based on a mount point field in the container configuration file, determining information about a volume mount point. In this way, firstly, after the migration, the Docker container still has the hierarchical structure of the image data on the destination side. Secondly, the state and configuration of the docker container after the migration are consistent with the state and configuration before the source migration. Thirdly, the state information saved in the data volume of the migrated Docker container remains consistent at the destination side.

According to one mode, iterative synchronization of the memory at least comprises steps of: creating a first checkpoint image file, synchronizing it to the destination machine container by means of storing it to a designate directory, and accomplishing a first round of said iterative synchronization of the memory by means of such configuring a -pre-dump parameter that a service process of the source machine container remains active; creating a second checkpoint image file for a second round of said iterative synchronization by means of taking the first checkpoint image file as a parent image and configuring the -parent parameter; and where the second checkpoint image file satisfies at least one of a first threshold requirement, a second threshold requirement and a third threshold requirement, accomplishing the iterative synchronization of the memory by means of synchronizing the second checkpoint image file to the destination machine container. In this way, firstly, the Docker containers are provided with the ability to create and restore incremental memory checkpoints. Secondly, the method can specify the data of the previous round of memory synchronization, based on the content of the previous round of memory data, save the modified content of the dirty page data of this round of memory. Thirdly, according to the preset downtime threshold range, the memory dirty page data to be transmitted is controlled within a certain range, which effectively reduces the downtime of Docker container online migration, while avoids the transmission of a large amount of redundant data caused by frequent memory modification.

According to one mode, the first threshold requirement is that a file of the memory to be transferred is smaller than a first set threshold; the second threshold requirement is that a number of iterations is greater than a second set threshold; and the third threshold requirement is that a ratio between sizes of the files of the memory corresponding to two successive said rounds of said iterative synchronization is greater than a third set threshold.

According to one mode, the restoration of the container at least comprises steps of: starting up the destination machine container by means of designating the container ID and the image files of the memory; where it is determined that the container to be restored is an offsite-migration container by means of performing localization determination, enabling the destination machine container to identify the offsite-migration container by means of dynamically loading configuration information of the container to be restored and bottom layer image information to an image storage driver; and where the container is successfully restored, generating information about successful migration and feeding it back to the source machine container, or where restoration of the container fails, generating information about failed restoration and feeding it back to the source machine container for restarting container services.

According to one mode, the step of dynamically loading the configuration information of the container to be restored and the bottom layer image information to the image storage driver at least comprises steps of: where the container to be restored is a local container, directly starting up the container to be restored; where the container to be restored is an offsite-migration container, according to parent-child relationship among the image layers, loading both image layer metadata of the container to be restored and read-write layers to the image layer storage driver; reading the container configuration file to a container object structure; based on the container object structure, acquiring an image ID of the container and loading its image metadata to the image storage driver; registering the container object to a container cache management structure; and according to the loaded container information, acquiring mounting information about a volume and registering it to the management driver object of the volume.

According to one mode, the data of the image layers at least comprises image layer metadata, and collection of the image layer metadata is conducted through steps of: based on the container ID, determining a directory corresponding to a container ID in /image/fs-driver/layerdb/mounts; according to record information about a parent file under the directory, determining image layer metadata of the parent image layer in /image/fs-driver/layerdb/sha256/layer-id; and collecting the image layer metadata by means of iterating the parent file.

According to one mode, the data of the image layers further comprises image metadata and volume data, and collection of the image metadata and the volume data is conducted through steps of: identifying an image ID of the container by analyzing an Image field of jsondata in the container configuration file, and accomplishing collection of the image metadata in /image/fs-driver/imaged/directory; and based on fields of Name and Source of jsondata in the information about a volume mount point, determining mount location of the volume and locating a root directory of the volume so as to accomplish collection of the volume data.

The present disclosure also discloses an online migration system for Docker containers. The online migration system at least comprises a file transfer module, a memory synchronization module, a container control module and a redundant processing module, wherein the file transfer module is configured to, based on different container file systems and parent-child relationship of their image layers, determine an integrating and collecting mechanism for data of the image layers so as to accomplish integration and collection of the data of the image layers; the redundant processing module is configured to, based on Diff commands between parent image layers and child image layers, determine a latest version of the data of the image layers, and transferring the latest version of the data of the image layers between a source machine container and a destination machine container so as to accomplish iterative synchronization of the data of the image layers; the memory synchronization module is configured to implement iterative synchronization of a memory by means of implementing a Pre-Copy mechanism; the container control module is configured to, when the iterative synchronization for both of the data of the image layers and the memory have been completed, perform restoration of the destination machine container.

According to one mode, the file transfer module is configured to accomplish integration and collection of the data of the image layers through steps of: identifying parent-child hierarchical relationship between tags of the image layers of the container based on the current file system and a container ID, and collecting configuration information about the container based on the container ID; based on the container ID and a container configuration file, integrating information about metadata of the image layers and information about metadata of a container image in an image management directory; and based on a mount point field in the container configuration file, determining information about a volume mount point.

According to a preferred mode, a memory synchronization module is for creating a first checkpoint image file, synchronizing it to a destination machine container by means of storing it to a designate directory, and accomplishing a first round of iterative synchronization of memory according to configuration -pre-dump parameters so that a service process of containers of a source machine remain active; creating a second checkpoint image file for a second round of iterative synchronization by means of taking a first checkpoint image file as a parent image and setting -parent parameters; and where the second checkpoint image file satisfies at least one of a first threshold requirement, a second threshold requirement and a third threshold requirement, accomplishing iterative synchronization of the memory by means of synchronizing the second checkpoint image file to the destination machine container.

According to a preferred mode, a migration failure processing module is for starting up the destination machine container by means of designating a container ID and a memory image file; where the container to be restored is determined as being an offsite-migration container by means of localization determination, and dynamically loading configuration information of the container to be restored and bottom layer image information to an image storage driver, so that the destination machine container can identify an offsite-migration container.

According to a preferred mode, the migration failure processing module is further for where the container is successfully restored, generating information about successful migration and feeding it back to the source machine container, or where restoration of the contain is failed, generating information about failed restoration and feeding it back to the source machine container for restarting container services.

The present invention has the following technical benefits:

The present invention takes the lead to provide a system for online migration of Docker containers, which features for migration transparent to users and second-order downtime;

The present invention supports integration and migration for various popular file systems, and achieves migration for different file systems in different ways;

The present invention provides a service assurance mechanism for restoring containers of the source machine after failed migration, so that in the event that the destination machine cannot restore containers or that restoration is failed, the source machine restores containers according to feedback information, thereby ensuring service reliability during migration; and The present invention provides redundant processing technology for image data, which reduces data transfer during migration without compromising container restoration, thereby minimizing the overall migration time.

DETAILED DESCRIPTION OF THE INVENTION

The invention as well as a preferred mode of use, further objectives and advantages thereof will be best understood by reference to the following detailed description of illustrative embodiments when read in conjunction with the accompanying drawings.

For clarity, some technical terms used in this document are defined as below:

Underlying technology layer: technical implementation required by implementation of an online migration framework system, not involving specific original functionality, but only technical contents necessary for migration workflow;

Migration data layer: a layer involving data to be migrated, which collecting all the data related to and required by migration from the perspective of containers;

Function layer: a specific function module during migration, in which every portion contains functional implementation specific to container migration;

Application layer: an actual scene combined with functions for implementation of an application to a data center, for accomplishing offline migration or online migration of the application;

Source machine container: a container that is in a physical host, aka a source machine, and needs to be migrated, as determined during migration;

Destination machine container: a container migrated to and operating on a designate physical host, aka a destination machine;

Daemon: a special program running in the background for executing specific system tasks, which is configured to automatically startup under guidance of a system and operate until the system is shut down, or startup as needed and automatically end when the relevant task is completed, such as daemons in the Unix operating system running in the background to execute different administration tasks;

Container: an open-source application engine, being able to packing software into a standardized unit for development, delivery and deployment;

Memory unit: contents of memory data in a physical machine occupied by a container running on the physical machine;

Image driver: a driver holding information about container images, through which, together with a file system driver type (such as AUFS, OVERLAY or OVERLAY2) image layer data can be organized and managed; and Dynamic load module: a module that load management context data related to containers migrated from a remote physical machine to a destination machine to a Docker daemon operating in the destination machine, so that the migrated containers can be directly managed by the Docker daemon in the destination machine.

Embodiment 1

Figure 2:
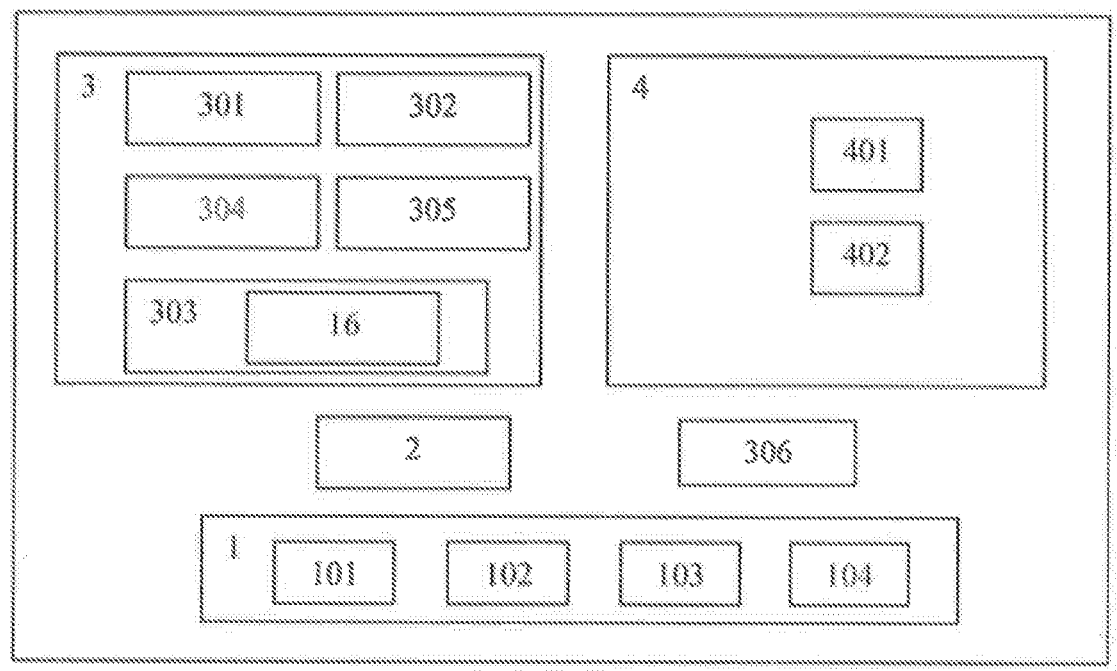
FIG. 2 is a structural diagram of a preferred online migration system according to the present invention.

As shown in FIG. 2, the present invention provides an online migration system for Docker containers, which at least comprises a base layer 1, a migration data layer 2, a function layer 3 and an application layer 4. The migration data layer 2 at least comprises container configuration data, image layer data, image layer metadata, image metadata and volume data, thereby providing data support to the function layer 3 and the application layer 4. The function layer 3 is used to perform, for example, integration, redundant processing, and memory iteration on data in the migration data layer 2, so as to prepare for migration of the data. The application layer 4 is used to execute online migration or offline migration of the containers.

Preferably, the base layer 1 at least comprises an initialization module 101, a CRIU module 102, a RPC communication module 103, and a migration control module 104. The initialization module 101 is used to detect and build, at the source end and the destination end, other basic modules and function modules required for online migration of Docker containers. On one hand, the initialization module 101 can detect whether configuration information about the system environments at both ends satisfy migration requirements. The system environment configuration information at least comprises CPU, kernel version, CRIU version, Docker version and other necessary tool information. Second, the initialization module 101 can build a communication module and a migration control module, thereby ensuring smooth migration. The CRIU module 102 is used to support checkpoint backup and restoration of real-time state information of Docker container processes, such as kernel information and memory states. It performs backup at the source end and performs restoration at the destination end. The RPC communication module 103 is used to support communication function at the source end and the destination end. It synchronizes the migration states at the two ends by means of remote procedure calls. The migration control module 104 is used to control the entire migration workflow, and combines the RPC communication module to control the two ends to operate step by step coordinately throughout the entire migration, thereby accomplishing the entire migration of Docker containers.

Preferably, the function layer 3 at least comprises a file transfer module 301, a memory synchronization module 302, a container control module 303, a redundant processing module 304, an image integration module 305 and a migration failure processing module 306. The file transfer module 301 is used to analyze all file data on which a container relies locally at the source end, and integrate file data or directory information before transferring the same to the relevant path in the destination end for the migrated Docker container to use. The memory synchronization module 302 is used for migration of the portion of memory on which the internal process of a Docker container depends. Migration of memory states dictates iterative synchronization. In other words, in each round of memory synchronization only the data of memory pages that were changed in the previous round are synchronized, so as to limit the memory data to be synchronized to a preset range, and in turn minimize the time for memory synchronization at the last round, thereby providing users with transparent migration experience. The container control module 303 has absolute control over containers to be migrated based on the workflow of online migration, and thereby accomplishes operations such as checkpoint backup, checkpoint restoration, shutting down, starting up, and destruction to containers at relevant step nodes. In the process of transferring image layer files of containers, it is possible that redundant file data existing across different image layers and the same image layers may already exist at the destination end. The redundant processing module 304 is thus used to analyze redundant data across different image layers and the image layer cache at the destination end, thereby preventing migration of redundant data. The image integration module 304 is used to adjust the hierarchical relationship of cache information of the image layers migrated to the destination machine image layer and to the destination end, so as to reconstruct parent-child relationship among different image layers as an image unity, thereby enabling the containers to access the data access. The migration failure processing module 306 is for fault-tolerant processing. Taking various abnormalities and errors that may happen during migration into account, the system has numerous fault-processing mechanisms in place for ensuring accuracy of container data and service reliability to prevent service non-accessibility and data inconsistency that might be otherwise caused by failed migration. Faults can be divided into two types. The first one is about failed startup of migrated container in the destination machine. In such a case, this module will erase the data in the migrated portion of the destination end and perform restoration at the source end so as to ensure service reliability. The second type is about disconnection or timeout responses between the source end and the destination. In the event that after a container is restored at the destination end but information about whether startup is successful or failed cannot be sent back to the source end due to network problems, the source end is unable to sense the operating state of the migrated container. In order to ensure consistent services of the container in such a case, the container data at the source end are preserved and no operation is performed.

Preferably, the application layer 4 at least comprises a real-time state offline migration module 401 and a real-time state online migration module 402. The real-time state offline migration module 401 is used to implement offline migration of containers. The real-time state online migration module 402 is used to implement online migration of containers.

For easy understanding, working principles of the disclosed real-time state offline migration module 401 and the real-time state online migration module 402 will be detailed below.

When offline migration of containers is required, the real-time state offline migration module 401 is activated so that the initialization module 101 monitors environment information of the two ends and builds modules. At this time, there is no need to build the memory synchronization module 302 and the CRIU module 102, and the RPC communication module 103 informs the migration control module 104 that this migration is offline migration. The migration control module 104 starts to coordinate the function modules to conduct migration. Specifically, the container control module 303 shuts down the containers designated to be migrated. The file transfer module 301 starts to perform two-end synchronization on all the data of the data layers to be migrated, and prevents unnecessary redundant data transfer during data synchronization using the redundant processing module 304. Then the image integration module 305 at the destination end integrates the image data of the incoming data layers, and incorporates the data cache information of the image layers at the destination end to adjust the hierarchical relationship among the image layers. Subsequently, the container control module 303 starts up migration at the destination end and destroys information about the migrated container at the source end. If any abnormality happens in this process, the migration failure processing module 306 will be informed and ordered to analyze the abnormality and carry out related measures.

When online migration of containers is required, the real-time state online migration module 402 is activated, so that the initialization module 101 monitors the environment information at the two sides and builds related modules. Through the RPC communication module 103, the migration control module 104 is informed that this migration is online migration. First, the file transfer module 301 is ordered to synchronize all data in the migrated data layers between the two ends, and the redundant processing module 304 works during the data synchronization to prevent unnecessary redundant data transfer. Then the memory synchronization module 302 works with the CRIU module 102 to perform iterative synchronization of memory. When a threshold requirement for stopping iteration is satisfied, through the RPC communication module 103, the container control module 303 is ordered to shut down the containers at the source end and perform the last round of memory synchronization. The container control module 303 at the destination end starts up the containers and restores the real-time states according to the checkpoint file of the container memory. Then the image integration module 305 at the destination end integrates image data in the incoming data layers, and incorporates data cache information of the image layers at the destination end to adjust the hierarchical relationship among the image layers. Subsequently, the container control module 303 starts up migration at the destination end and destroys information about the migrated container at the source end. If any abnormality happens in this process, the migration failure processing module 306 will be informed and ordered to analyze the abnormality and carry out related measures.

Preferably, the online migration system for Docker containers comprises a memory, one or more processors and one or more programming modules. The programming module at least comprises one or more of an initialization module, a CRIU module, a RPC module, a migration control module, a file transfer module, a redundant processing module, an image integration module, a migration failure processing module, a real-time state offline migration module and a real-time state online migration module. The programming module is stored in the memory and enables operations through one or more processors. The operations at least comprise determining an integrating and collecting mechanism for data of the image layers based on different container file systems and parent-child relationship of their image layers so as to accomplish integration and collection of the data of the image layers; determining the latest version of the data of the image layers based on Diff commands between the parent and child image layers, and transferring the latest version of the data of the image layers between containers of the source machine and of the destination machine so as to accomplish iterative synchronization of the data of the image layers; implementing iterative synchronization of a memory by means of a pre-copy mechanism; and when iterative synchronization for both the data of the image layers and the memory has been accomplished, performing restoration of containers in the destination machine.

Preferably, the initialization module may be a server that has other basic modules required by testing and building of online migration of Docker containers at the source end and at the destination end. The CRIU module may be a server configured to save process states as files and restore processes according to the files. The RPC communication module may be a communication chip that is capable of wireless communication. The migration control module 104 may be a server that is capable of controlling the entire migration flow. The file transfer module 301 may be a server that is capable of analyzing all file data the container relies on locally, and integrating information about file data or about directories. The memory synchronization module 302 may be a server that is capable of performing iterative synchronization on memory states. The container control module 303 may be a server that is capable of performing checkpoint backup for, performing checkpoint restoration for, shutting down, starting up, and destroying containers. The redundant processing module 304 may be a server that is capable of analyzing redundant data among different image layers and caches of image layers at the destination end. The image integration module 305 may be a server that is capable of adjusting the hierarchical relationship of cache information between the image layers migrated to the destination machine and the image layers at the destination end. The migration failure processing module 306 may be a server that is capable of preventing non-accessibility and data inconsistency of services caused by failed migration by means of providing plural failure processing mechanisms without compromising data accuracy and service reliability of the containers. The real-time state offline migration module 401 and the real-time state online migration module 402 may each be a client that is to be accessed and controlled by a third party.

Preferably, the real-time state offline migration module 401 is connected to the initialization module 101 and the RPC communication module 103. The real-time state online migration module 402 is connected to the initialization module 101 and the RPC communication module 103. The RPC communication module 103 is connected to the migration control module 104. The migration container module 104 is connected to the container control module 303. The file transfer module 301, the memory synchronization module 302, the redundant processing module 304 and the image integration module 305 are all connected to the migration control module 104.

Embodiment 2

The present embodiment provides further improvements to Embodiment 1, and what is identical to its counterpart in the previous embodiment will not be repeated in the following description.

Figure 1:
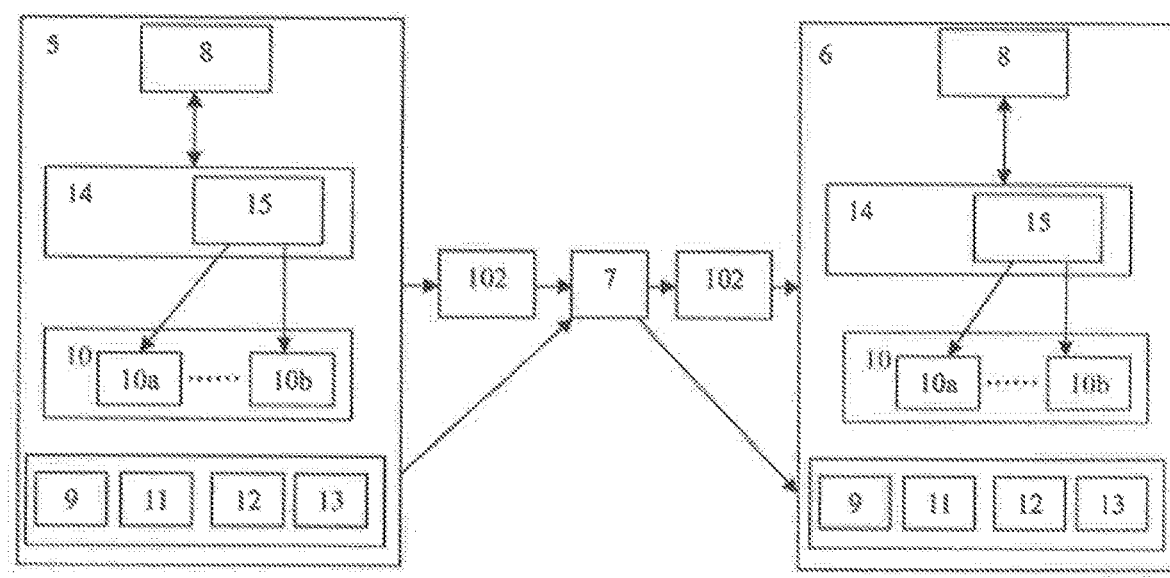
FIG. 1 illustrates a preferred application environment of online migration for Docker containers according to the present invention.

As shown in FIG. 1, the source machine container 5 and the destination machine container 6 are connected through a transfer end 7, so that they can exchange data. Through the transfer end 7, the source machine container 5 and the destination machine container 6 can be connected to the online migration system of the present invention, so that online migration of container process can be performed by the CRIU module. The source machine container 5 and the destination machine container 6 are each configured to have a daemon 8, an image layer 9, containers 10 and a memory unit 14. The daemon 8 is used to receive a request from a client and process the request. The image layer 9 is configured to at least support working modes of an AUFS file system 11, an Overlay file system 12 and an Overlay2 file system 13. The memory unit 14 includes an image driver 15, through which startup of the containers 10 can be performed. Preferably, containers 10 may include a plurality of first containers 10a and at least one second containers 10b. The first containers 10a are containers that do not need migration and the second container 10b is a container needs to be migrated.

Preferably, as shown in FIG. 1, the present invention further provides a method for implementation and optimization of an online migration system for Docker containers. The method involves collecting data of image layers of container at containers in a source machine, and taking a read-write layer of the container as an entry to build all the data of the image layers required by the containers according to parent-child relationship among the image layers. The data of the image layers include the actual data of the image layers, image layer metadata and image metadata information. Then after all the data of the image layers required by the containers are transferred to the corresponding directory in a container in the destination machine, the CRIU module performs iterative synchronization on the source machine container memory and the read-write layer using a pre-copy migration mechanism. When the iterations satisfy the threshold requirement of Stop-and-Copy, container service on the source machine is shut down, and the last round of iterative synchronization is performed. After synchronization, storage driver information related to the migrated container is dynamically loaded, so that the container on the destination machine can identify the migrated container and manage it. At last, migration is accomplished by restoring the real-time state of the container according to the iteratively synchronized memory images. Specifically, the method of implementation and optimization at least comprises the following steps.

S1 involves determining an integrating and collecting mechanism for data of the image layers based on different container file systems and parent-child relationship of their image layers.

Preferably, different integrating and collecting mechanisms are used for the AUFS file system 11, the Overlay file system 12 and the Overlay2 file system 13. The collected information about the image layers at least comprises container configuration information, data of the image layers, image layer metadata, image metadata and volume data. Integration of information about the locations of data provides a basis for redundant processing of image data. Specifically, integration and collection of the data of the image layers and at least comprises the following steps.

A1 involves determining the parent-child relationship among tags of the image layers of the container based on the current file system and the container ID. For example, upper_dir can be used as the parent image layer of lower_dir1, and lower_die1 can be used as the parent image layer of lower_dir2, thereby identify the parent-child relationship among all the image layers in the entire image through the foregoing configuration.

A2 involves collecting the configuration information of the container according to the container ID. For example, configuration information of the container can be collected in the directory/container according to the container ID. Configuration information of a container at least comprises the container name, the mount address of the container volume, the image ID on which the container depends, the time the container was created and the time the container was started up last time.

A3 involves integrating image layer metadata information and container image metadata information in the image management directory, image/, according to the container ID and the container configuration file config.v2.json.

A4 involves determining information about a volume mount point based on the mount point field in the container configuration file config.v2.json. For example, through analysis of the Name and Source fields of the json structure of MountPoints, it is possible to determine whether the volume is mounted on the default volume mount point or on a custom data mount point, and to at last locate it to the volume root directory.

For easy understanding, the detailed configuration of the integrating and collecting mechanism will be discussed below with reference to different file systems.

Preferably, the AUFS file system 11 has three sub-directories, namely/diff, /mnt and /layers. The sub-directory /diff is used to store actual data of image layers. The sub-directory /mnt is used to store the union mount points of all containers. The sub-directory /layers is used to store all layer-level parent-child relationship. First, according to the container ID, a directory mnt_id of the union mount /mnt is acquired in the /image/layerdb/mounts/container_id/ mounts-id file under the root directory of the container. Second, according to the mnt_id, the portal of the top image layer is found under the sub-directory /diff, and all the parent image layers parent ids recorded in the file corresponding to mnt_id under the directory /layers are analyzed. At last, according to the parent image layer id, data of all parent image layers under the directory /diff are collected.

Preferably, for the Overlay file system 12, the root directory directly leads to all the image layer directories, including the top image layer and bottom image layer. According to the container ID and the information recorded in the file mounts-id, the directory id of the top image layer of the container can be ascertained. The corresponding id directory found in the overlay system is information about the top image layer. Then information about all the parent image layers can be acquired through iterations of the lower-id file in the image layer directory.

Preferably, for the Overlay2 file system 13, the root directory directly leads to short name directories formed by all the image layer directories plus the image layer directory ids. Under each image layer directory, there are at least the sub-directory /diff, a link file and a lower file. The sub-directory /diff is used to store the actual data of the image layers. The link file records the short names of the image layers. The lower file records the information about the short name links of all the parent image layers in the image layer. According to the lower file, all the image layer information of all the containers can be collected. Meanwhile, the corresponding image layer directory can be found by analyzing the mapping process of the image layer short names to the image layer directory ids.

Preferably, the image layer metadata are collected in the same way for all the three of the AUFS file system 11, the Overlay file system 12 and the Overlay2 file system 13. Specifically, the directory corresponding to the container IDs can be found in /image/fs-driver/layerdb/mounts according to the container IDs, and the image layer metadata of the parent image layer can be found in /image/fs-driver/ layerdb/sha256/layer-id according to the parent file record information under the directory, thereby collecting the image layer metadata through parent file iterations.

Preferably, to collect the image metadata, the Image field of jsondata in the configuration file config.v2.json of the container is analyzed so as to acquire the image ID of the container, and then the image metadata can be collected in the directory /image/fs-driver/imagedb/.

S2 involves deleting the old version of the data of the image layers based on comparison of Diff commands between the parent and child image layers, and accomplishing iterative synchronization of the data of the image layers by transfer of the latest version of the data of the image layers between the source machine container 5 and the destination machine container 6 using the transfer end 7.

Figure 3:
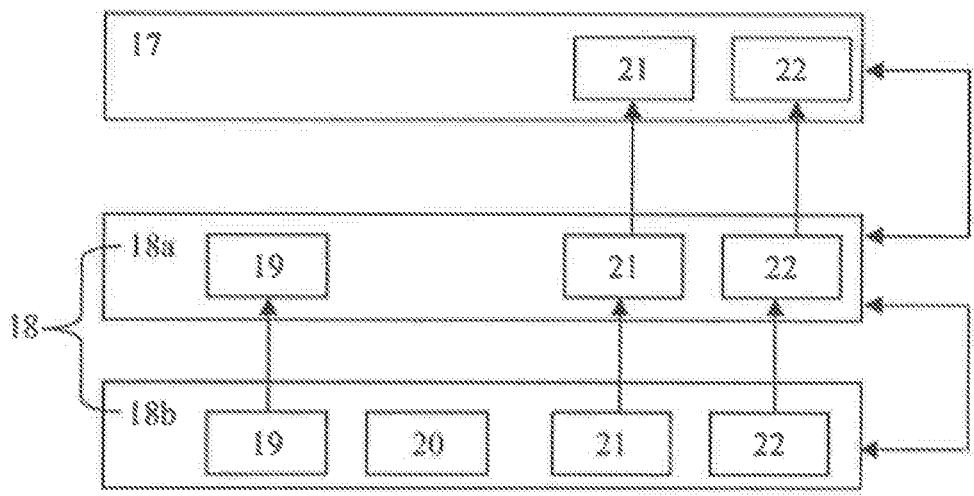
FIG. 3 is a flowchart of preferred image redundant processing according to the present invention.

Specifically, the location of the latest version of every file is ascertained by means of comparing the called Diff commands layer by layer according to the parent-child relationship among the image layers, so as to determine the latest file to be migrated in the image layer 9. By deleting the old versions of the files, the data to be migrated and in turn the migration time can be minimized. Preferably, where the container is configured with the AUFS file system 11 or the Overlay2 file system 13, the AUFS file system 11 or the Overlay2 file system 13 has at least one top image layer 17 and plural bottom image layers 18. The top image layer 17 and the bottom image layers 18 each have the latest version of the file data. The operating environment of the container solely depends on the latest version of the file data, and is independent of the old data. Therefore, by comparing the Diff commands called layer by layer, the old data can be deleted. For example, as shown in FIG. 3, when the container is configured with the AUFS file system, it may have a top image layer 17, a first bottom image layer 18a and a second bottom image layer 18b. The first bottom image layer has a first file, a second file, a third file and a fourth file. The first bottom image layer has a first file, a third file and a fourth file. The top image layer 17 has a third file and a fourth file. The second bottom image layer 18b and the first bottom image layer 18a first execute the Diff command. When the second bottom image layer 18b and the first bottom image layer 18a have the same files, the file in the first bottom image layer 18a is taken as the latest version, and the file in the second bottom image layer is deemed as the old version that is to be deleted. When the first bottom image layer 18a and the top image layer 17 execute Diff, the files in the top image layer 17 are taken as the latest version, and the files in the first bottom image layer are deemed as old and deleted. Eventually, it is conformed that the latest version of the first file is in the first bottom image layer 18a, and the latest version of the second file is in the second bottom image layer 18b, while the latest versions of the third file and the fourth file are both in the top image layer 17. When the latest versions of the first file, the second file, the third file and the fourth file are located, their respective latest versions are transferred to the image layer 9 of the destination machine container.

Preferably, where the container is configured with the Overlay file system 12, the Overlay file system 12 only has a top image layer 17 and a bottom image layer 18. At this time, the top image layer 17 has the hard link to the bottom layer file, so it is enough to synchronize the files in the top image layer 17 to the destination machine container 6, and there is no need to synchronize the files in the bottom image layer 18 to the destination machine container.

In S3, online migration of the container process is performed through the CRIU module by means of using a pre-copy mechanism.

Preferably, after data migration of the image layer of the container, iterative synchronization of the memory is performed through the CRIU module 102 by means of using the pre-copy migration mechanism. The iterative synchronization at least comprises the following steps.

In B1, the source machine container 5 creates a first checkpoint image file for its migrated container 10b, and synchronizes it to the destination machine container 6 by means of storing it to a designate directory, and -pre-dump parameters are such set that the service process of the source machine container 5 remains active, thereby accomplishing the first round of iterative synchronization of the memory. For example, the designate directory may be set using—checkpoint-dir with /var/lib/docker/containers/<containerID>/checkpints set as default, and the synchronization process still uses rsync. The -pre-dump parameters are Boolean variables, used to indicate that the current round of iteration needs to use the previous round memory iteration data as the basis to backup memory usage delta.

In B2, the first checkpoint image file is taken as the parent image and a second checkpoint image file is created for the second round of iterative synchronization by means of setting the -parent parameters.

Step B3 involves where the second checkpoint image file meets at least one of the first threshold requirement, the second threshold requirement and the third threshold requirement, accomplishing iterative synchronization on the memory by synchronizing the second checkpoint image file to the destination machine container. The first threshold requirement is that a file of the memory to be transferred is smaller than a first set threshold, which may be, for example, set at 5000 kb. The second threshold requirement is that the number of iterations is greater than a second set threshold, which may be, for example, set at 8. The third threshold requirement is that the ratio between the files of the memory corresponding to two successive said rounds of said iterative synchronization is greater than a third set threshold, which may be, for example, set at 0.8. The ratio of the two memory files being greater than the third set threshold means that the memory is not substantively reduced by the iterations. Preferably, the second checkpoint image file may include the real-time states of the memory and the kernel and memory file data.

Preferably, when the second checkpoint image file does not satisfy any of the first threshold requirement, the second threshold requirement and the third threshold requirement, the checkpoint image file of the previous round of iterative synchronization is used as the parent image, and a checkpoint image file for the next round is created by setting the -parent parameters again, until the checkpoint image file satisfies at least one of the first threshold requirement, the second threshold requirement and the third threshold requirement.

In S4, when iterative synchronization of the image layers between the memory and the container is completed, container restoration is performed on the destination machine container 6.

Preferably, where the container image data and the memory are both synchronized from the source machine container 5 to the destination machine container 6, container restoration is performed on the destination machine. For example, to perform container restoration for the destination machine, information about its container image layer has to be first loaded to the corresponding image driver 15, so that the daemon 8 of the destination machine container 6 can manage the second container 10b through the image driver 15. Preferably, online migration of the container management authority can be accomplished by means of modifying the Docker source code, adding localization determination to the second container 10b and adding the dynamic load module 16 of the image driver 15. Modification of the Docker source code can modify the startup workflow of containers. The dynamic load module added to the startup workflow of Docker containers is used to load all the information about the migrated container such as configuration, image, and volume to the Docker daemon for management. Specifically, the container restoration for the destination machine container 6 at least comprises the following steps.

C1 involves designating the container ID and the image files of the memory so as to startup the container 10 in the destination machine container 6, and having the daemon 8 perform localization determination to determine whether the container to be restored is a local container or an offsite-migration container. Restoration a local container happens when the container is backed up for its real-time state locally and shut down, but the local Docker management driver already has its related information, so there is no need to perform dynamic load. Restoration of an offsite-migration container happens when the container is migrated from another node to the local site, and before migration the local Docker management driver does not have any information about the container to be migrated, so the dynamic load module has to perform load. Through localization determination, it is possible to determine whether the container to be restored is a local container by means of analysis of the container cache management structure. For example, according to the container ID information, it is to be checked in the Docker image management driver whether the configuration information of the container corresponding and all the data of the image layers of the container image has been successful loaded. If the search result is negative, it means that the container is not a local container, and therefore dynamic load has to be performed.

In C2, where it is determined that the container to be restored is an offsite-migration container through localization determination, the dynamic load module 16 is activated to dynamically load the configuration information of the container to be restored and the bottom layer image information to the relevant image storage driver, so that the daemon 8 of the destination machine container 6 can identify the offsite-migration container. For example, configuration information of the container to be restored may be a container configuration file config.v2.json.

C3: if the container to be restored is restored successfully, feeding information about successful migration to the source machine container 5, or, otherwise, feeding information about failed restoration to the source machine container 5 so that the source machine container 5 timely restarts the container service. For example, when the daemon is able to check the operating state of the container and the services provided by the container can be accessed normally, it means that the container is restored successfully.

Embodiment 3

The present embodiment provides further improvements to the previous embodiments, and what is identical to its counterpart in the previous embodiment will not be repeated in the following description.

Preferably, the dynamic load module 16 is configured to dynamically load the configuration information about the container to be restored and the bottom layer image information to the corresponding image storage driver through the following steps:

D1: determining whether the container to be restored is a local container, and if the container to be restored is a local container, directly starting up the container to be restored;

D2: if the container to be restored is an offsite-migration container, according to parent-child relationship among the image layers, loading image layer metadata of the container to be restored to the image layer storage driver and loading the read-write layer to the image layer storage driver;

D3: loading the container information, such as the container configuration file config.v2.json under the directory of docker/containers/id/, to the container object structure;

D4: acquiring the image ID of the container according to the loaded container object structure, and loading its image metadata to the image storage driver;

D5: registering the container object to the container cache management structure; and D6: according to the container information of the load, acquiring the mounting information of the volume and registering the mounting information to the management driver object of the volume.

It should be noted that the above specific embodiments are exemplary, and those skilled in the art can come up with various solutions inspired by the disclosure of the present invention, and these solutions also fall into the scope of the present disclosure and fall into the present Within the scope of the invention. Those skilled in the art should understand that the description of the present invention and the accompanying drawings are illustrative and do not limit the claims. The scope of protection of the present invention is defined by the claims and their equivalents.

What is claimed is:

1. A method for implementation and optimization of an online migration system for Docker containers, the method comprising the steps of:
    based on different container file systems and parent-child relationship of their image layers, determining an integrating and collecting mechanism for data of the image layers so as to accomplish integration and collection of the data of the image layers, including:
        identifying parent-child hierarchical relationship between tags of the image layers of the container based on the current file system and a container ID, and collecting configuration information about the container based on the container ID;
        based on the container ID and a container configuration file, integrating information about metadata of the image layers and information about metadata of a container image in an image management directory; and
        based on a mount point field in the container configuration file, determining information about a volume mount point;
    based on Diff commands between parent image layers and child image layers, determining a latest version of the data of the image layers, and transferring the latest version of the data of the image layers between a source machine container and a destination machine container so as to accomplish iterative synchronization of the data of the image layers;

implementing iterative synchronization of a memory by means of implementing a Pre-Copy mechanism, wherein the iterative synchronization of a memory includes:

creating a first checkpoint image file, synchronizing the first checkpoint image file to the destination machine container by means of storing the first checkpoint image file to a designate directory, and accomplishing a first round of said iterative synchronization of the memory by means of such configuring a pre-dump parameter that a service process of the source machine container remains active;

creating a second checkpoint image file for a second round of said iterative synchronization by means of taking the first checkpoint image file as a parent image and configuring the -parent parameter; and where the second checkpoint image file satisfies at least one of a first threshold requirement, a second threshold requirement and a third threshold requirement, accomplishing the iterative synchronization of the memory by means of synchronizing the second checkpoint image file to the destination machine container; and when the iterative synchronization for both of the data of the image layers and the memory have been completed, performing restoration of the destination machine container.

2. The method of claim 1, wherein the first threshold requirement is that a file of the memory to be transferred is smaller than a first set threshold;

the second threshold requirement is that a number of iterations is greater than a second set threshold; and the third threshold requirement is that a ratio between sizes of the files of the memory corresponding to two successive said rounds of said iterative synchronization is greater than a third set threshold.

3. The method of claim 2, wherein the restoration of the container at least comprises steps of:

starting up the destination machine container by means of designating the container ID and the image files of the memory;

where it is determined that the container to be restored is an offsite-migration container by means of performing localization determination, enabling the destination machine container to identify the offsite-migration container by means of dynamically loading configuration information of the container to be restored and bottom layer image information to an image storage driver; and where the container is successfully restored, generating information about successful migration and feeding the information about successful migration back to the source machine container, or where restoration of the container fails, generating information about failed restoration and feeding the information about failed restoration back to the source machine container for restarting container services.

4. The method of claim 3, wherein the step of dynamically loading the configuration information of the container to be restored and the bottom layer image information to the image storage driver further comprises the steps of:

where the container to be restored is a local container, directly starting up the container to be restored;

where the container to be restored is an offsite-migration container, according to parent-child relationship among the image layers, loading both image layer metadata of the container to be restored and read-write layers to the image layer storage driver;

reading the container configuration file to a container object structure;

based on the container object structure, acquiring an image ID of the container and loading image metadata the image ID to the image storage driver;

registering the container object to a container cache management structure; and according to the loaded container information, acquiring mounting information about a volume and registering it to the management driver object of the volume.

5. The method of claim 4, wherein the data of the image layers at least comprises image layer metadata, and collection of the image layer metadata is conducted through the steps of:

based on the container ID, determining a directory corresponding to a container ID in /image/fs-driver/layerdb/mounts;

according to record information about a parent file under the directory, determining image layer metadata of the parent image layer in /image/fs-driver/layerdb/sha256/layer-id; and collecting the image layer metadata by means of iterating the parent file.

6. The method of claim 5, wherein the data of the image layers further comprises image metadata and volume data, and collection of the image metadata and the volume data is conducted through the steps of:

identifying an image ID of the container by analyzing an Image field of jsondata in the container configuration file, and accomplishing collection of the image metadata in /image/fs-driver/imagedb/directory; and based on fields of Name and Source of jsondata in the information about a volume mount point, determining mount location of the volume and locating a root directory of the volume so as to accomplish collection of the volume data.

* * * * *